United States Patent [19]

Higashiyama

[11] Patent Number: 5,321,739
[45] Date of Patent: Jun. 14, 1994

[54] CORDLESS TELEPHONE APPARATUS WITH MESSAGE RECORDING AND REPRODUCING MEANS

[75] Inventor: Mitsuo Higashiyama, Kanagawa, Japan

[73] Assignee: Sony Corporation, Tokyo, Japan

[21] Appl. No.: 972,661

[22] Filed: Nov. 6, 1992

[30] Foreign Application Priority Data

Nov. 8, 1991 [JP] Japan .................. 3-321156
Nov. 8, 1991 [JP] Japan .................. 3-321157

[51] Int. Cl.$^5$ .................. H04M 11/00; H04M 1/64
[52] U.S. Cl. .................. 379/61; 379/63; 379/67
[58] Field of Search .................. 379/58, 61, 63, 67, 379/88, 89, 210

[56] References Cited

U.S. PATENT DOCUMENTS

| | | | |
|---|---|---|---|
| 4,837,802 | 6/1989 | Higashiyama etal. | 379/58 |
| 4,881,259 | 11/1989 | Scordato | 379/58 |
| 4,962,524 | 9/1990 | Murata et al. | 379/61 |
| 5,050,206 | 9/1991 | Shimanuki | 379/67 |
| 5,105,458 | 4/1992 | Takenaka | 379/58 |

FOREIGN PATENT DOCUMENTS

| | | |
|---|---|---|
| 0046623 | 3/1982 | European Pat. Off. ...... H04M 3/50 |
| 0203819 | 3/1986 | European Pat. Off. ...... H04M 1/72 |
| 9003068 | 3/1990 | PCT Int'l Appl. .......... H04B 1/00 |
| 2160390 | 12/1985 | United Kingdom . |

*Primary Examiner*—Curtis Kuntz
*Assistant Examiner*—I. Rana
*Attorney, Agent, or Firm*—Pasquale Musacchio; Jerry A. Miller

[57] ABSTRACT

A cordless telephone apparatus comprising a master unit connected to a telephone line and slave units each connected to the master unit via a radio wave channel. The master unit includes a recording/reproducing circuit for recording an incoming message from a calling party on the telephone line and reproducing the recorded message in response to a request. The recording/reproducing circuit has a recording medium to record and reproduce the message, and a management area to manage the messages recorded on the recording medium. When the incoming message from the calling party is recorded on the recording medium in the recording/reproducing circuit, data for managing such message recording is registered in the management area in response to a key designation corresponding to the slave unit. And when a predetermined key operation is performed in the slave unit, the message relative to the key-operated slave unit is reproduced from the recording medium in accordance with the data registered in the management area.

6 Claims, 7 Drawing Sheets

FIG. 2

FIG. 3
400 ICM RECORDING ROUTINE

| AREA | | No | START ADDRESS | END ADDRESS |
|---|---|---|---|---|
| K1 | (SLAVE 11) | 1 | $A_0$ | $A_1$ |
| | | 2 | $A_4$ | $A_5$ |
| | | 3 | | |
| | | ⋮ | | |
| | | 10 | | |
| K2 | (SLAVE 12) | 1 | $A_8$ | $A_9$ |
| | | 2 | | |
| | | ⋮ | | |
| | | 10 | | |
| K3 | (SLAVE 13) | 1 | | |
| | | 2 | | |
| | | ⋮ | | |
| | | 10 | | |
| K4 | (SLAVE 14) | 1 | $A_2$ | $A_3$ |
| | | 2 | | |
| | | ⋮ | | |
| | | 10 | | |
| K5 | (SLAVE 15) | 1 | $A_6$ | $A_7$ |
| | | 2 | | |
| | | ⋮ | | |
| | | 10 | | |
| K0 | (COMMON) | 1 | | |
| | | 2 | | |
| | | ⋮ | | |
| | | 10 | | |

MTBL

FIG. 7

CORDLESS TELEPHONE APPARATUS WITH MESSAGE RECORDING AND REPRODUCING MEANS

BACKGROUND OF THE INVENTION

1. Field of the Invention

The present invention relates to a cordless telephone apparatus and, more particularly, to an apparatus equipped with a master unit which is capable of recording incoming messages originated from calling parties through an outside telephone line.

2. Description of the Prior Art

In the conventional cordless telephone apparatus known heretofore, there is a type adapted to operate a plurality of slave units.

In an exemplary cordless telephone apparatus where a master unit is capable of handling a plurality of slave units and has a function of recording an ICM (incoming message) received through an outside telephone line, there may occur the following situation. Suppose now that, in a home for example, the slave units are allocated to individual family members respectively, and a terminating call from an outside telephone line has been received by a mother at one slave unit allocated to her. In this case, however, the calling party on the line wants to talk to her child who is presently away from home. Then the calling party desires to leave a message for the child with a wish that such message is not heard by anybody else and is kept secret.

OBJECTS AND SUMMARY OF THE INVENTION

The present invention has been accomplished in view of the circumstances mentioned. And its object resides in realizing a novel function that when, during a call between one slave unit and an outside telephone line, the calling party wants to leave a message for a person who uses the other slave unit allocated to him, such message can be relayed and recorded in such a manner as to be heard merely by the user of the other slave unit alone. (hereinafter this function will be referred to as "relay recording").

And another object of the present invention is to provide an improvement wherein, if one of the family members previously informs his friend or the like of the number of his slave unit, a message received from the friend during the user's absence can be recorded, and such message can be selectively extracted and heard as desired without being heard by any other family member to consequently maintain the privacy.

According to one aspect of the present invention, there is provided a cordless telephone apparatus comprising a master unit connected to an outside telephone line and a plurality of slave units each connected to the master unit via a radio wave channel. In this apparatus, the master unit includes a recording/reproducing means for recording an incoming message from a calling party on the telephone line and reproducing the recorded message in response to a request. The recording/reproducing means has a recording medium to record and reproduce the message, and a management area to manage the messages recorded on the recording medium. When the incoming message from the calling party is recorded on the recording medium in the recording/reproducing means, data for managing such message recording is registered in the management area in response to a key designation corresponding to the slave unit. And when a predetermined key operation is performed in the slave unit, the message relative to the key-operated slave unit is reproduced from the recording medium in accordance with the data registered in the management area.

If a predetermined key operation is performed in a first slave unit for example during a call between the outside telephone line and such slave unit, an incoming message received through the telephone line is recorded on the recording medium in the recording/reproducing means, and simultaneously the data relative to such message recording is registered in a management table. When the user of a second slave unit manipulates a predetermined key, the message recorded on the recording medium is reproduced therefrom in accordance with the data registered in the management table, and the message thus reproduced is transmitted to the second slave unit. Therefore the message from the outside telephone line can be properly relayed to the user of the second slave unit. The message can be heard merely by the user of the second slave unit alone without being heard by the user of any other slave unit.

Meanwhile in an absence recording mode, when a calling party depresses, out of dial keys, a numeral key corresponding to the slave unit, his message is recorded on the recording medium and simultaneously the data indicative of the message-recorded area on the recording medium is registered in the management table. And in response to a predetermined key operation in the slave unit, the data relative to the key-operated slave unit is extracted from the table, and the message recorded in the area indicated by such data is reproduced therefrom and then is transmitted to the key-operated slave unit from the master unit via the radio wave channel. All the messages to the individual slave units are recorded in common on one recording medium. And in response to a request sent from any slave unit for reproduction of the messages, merely the message for such slave unit alone is selectively reproduced and then is transmitted to the relevant slave unit.

In any of the operation modes mentioned, it is possible to observe the secrecy of messages to consequently maintain privacy.

The above and other features and advantages of the present invention will become apparent from the following description which will be given with reference to the illustrative accompanying drawings.

DESCRIPTION OF THE PREFERRED EMBODIMENT

Hereinafter an embodiment of the present invention will be described with reference to the accompanying drawings.

Figure 1:
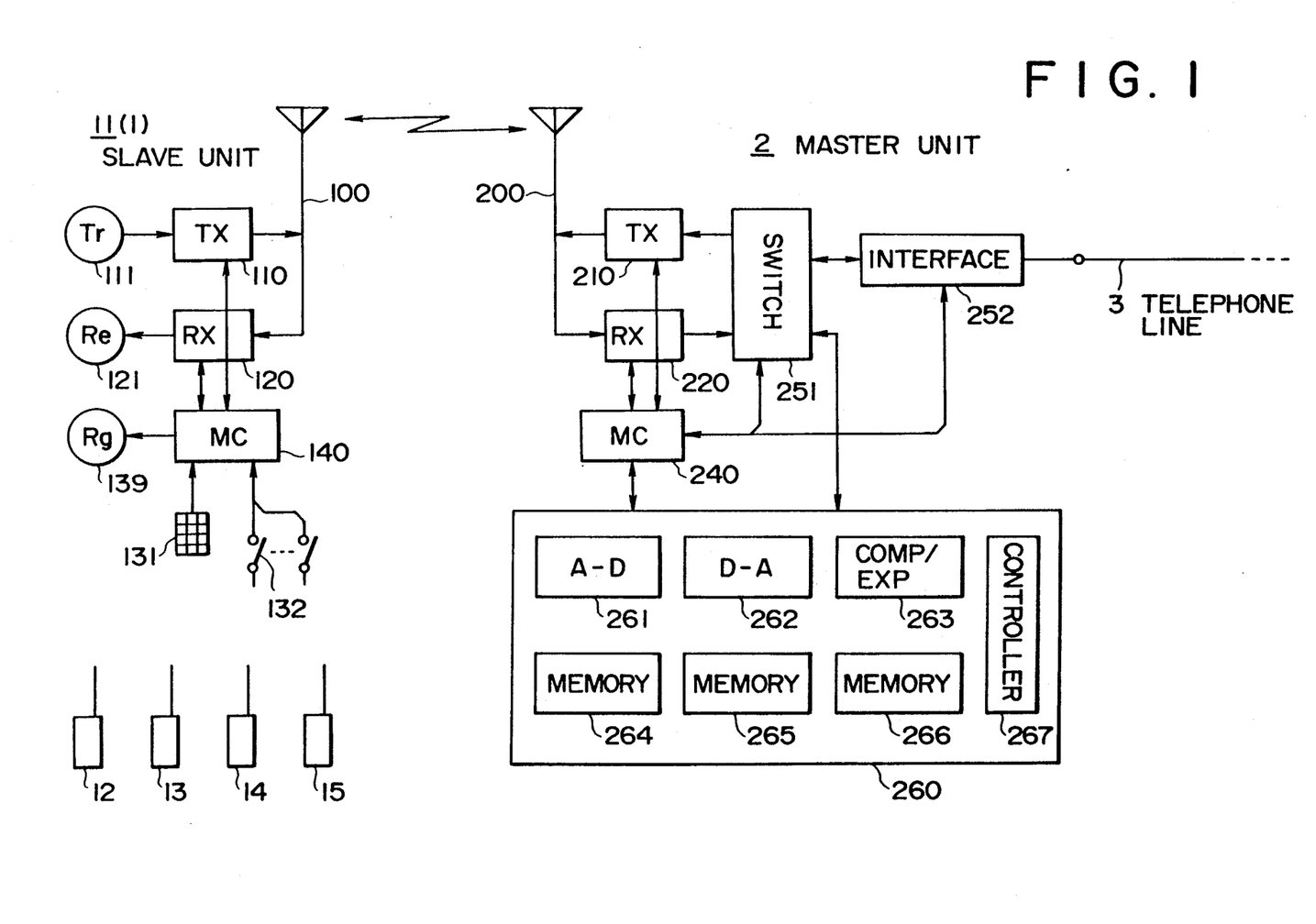
FIG. 1 is a system diagram of a cordless telephone apparatus embodying the present invention.

FIG. 1 is a system diagram showing an exemplary case where a master unit 2 is capable of operating five slave units 11 to 15, in which reference numeral 3 denotes an outside telephone line. It is defined here that the slave units 11 to 15 are numbered "1" to "5" respectively. Since the slave units 11 to 15 are the same in structure and function, the slave unit 1 will be explained as a representative in the following description except when exact distinction among the individual slave units 11-15 is necessary.

The apparatus has a relay recording function in addition to an absence answering function performed in the absence of the user, and is capable of recording voice signal of any of the following messages in a memory and reproducing the same signal therefrom.

(1) Message received in a relay recording mode;

(2) OGM (outgoing message) transmitted in an absence answering/recording mode in response to a terminating call for informing any calling party of the user's absence;

(3) ICM (incoming message) received in the absence answering/recording mode from an outside telephone line.

In the description given below, a message received in the relay recording mode will also be referred to as an ICM unless no distinction is necessary from any ICM in the absence answering/recording mode.

In the slave unit 1, there are provided a transmitting-/receiving antenna 100, a circuit 110 for transmitting a voice signal and an aftermentioned command signal CMND, a voice transmitter 111, a circuit 120 for receiving the voice signal and the command signal CMND, a voice receiver 121, dial keys 131, operation keys 132, and a terminating-call ringer 139.

Denoted by 140 is a system controlling microcomputer which controls the operations of both the transmitting circuit 110 and the receiving circuit 120, the transmission/reception channel thereof, and further serves to code or decode the command signal CMND. In an unshown memory incorporated in the microcomputer 140, there are stored an identification code SYID for discriminating this cordless telephone apparatus from any other apparatus, and a slave unit code HSID indicative of the slave unit number (one of 1 through 5).

Figure 2:
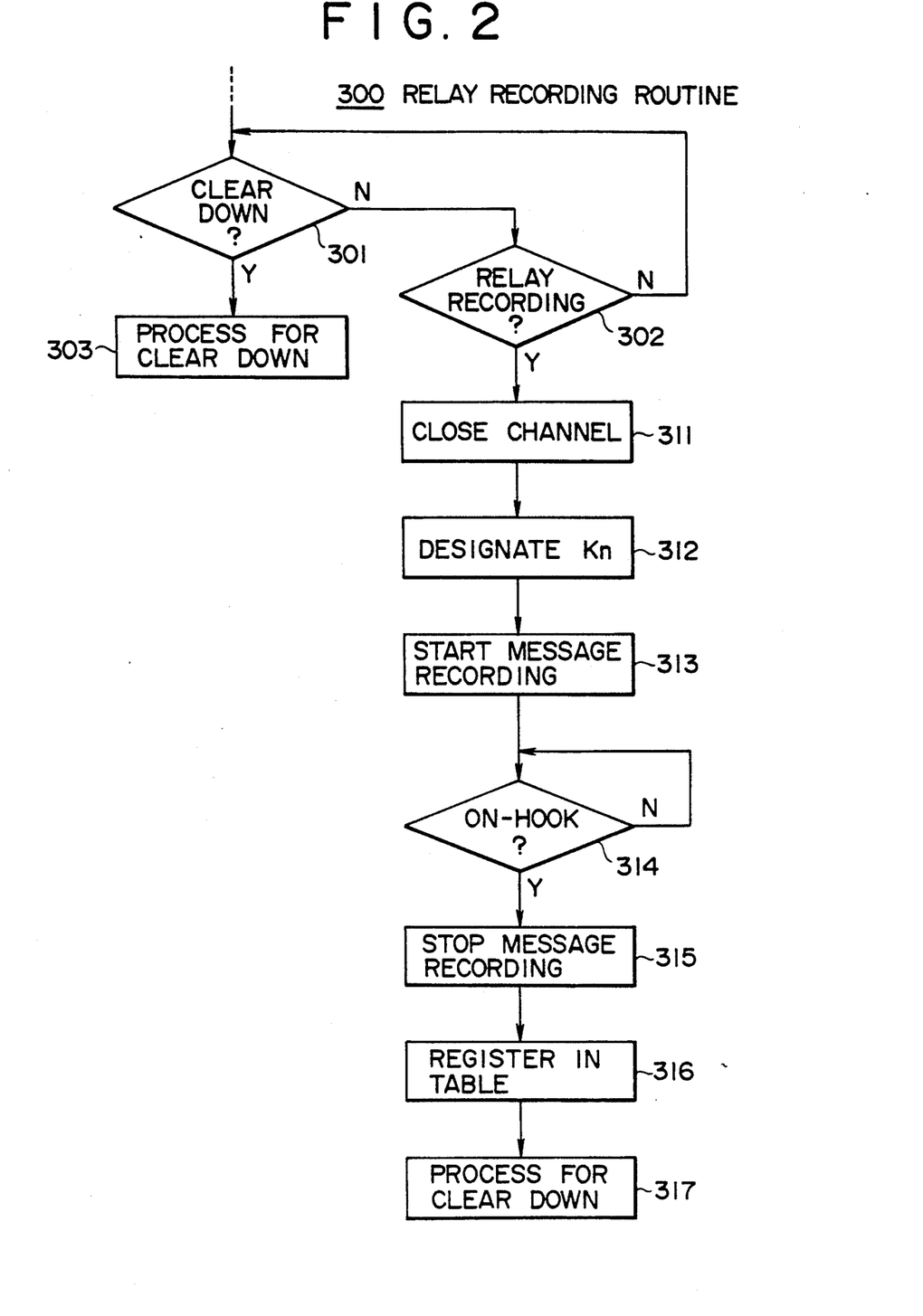
FIG. 2 is a flow chart of a processing routine executed in a relay recording mode.
Figure 3:
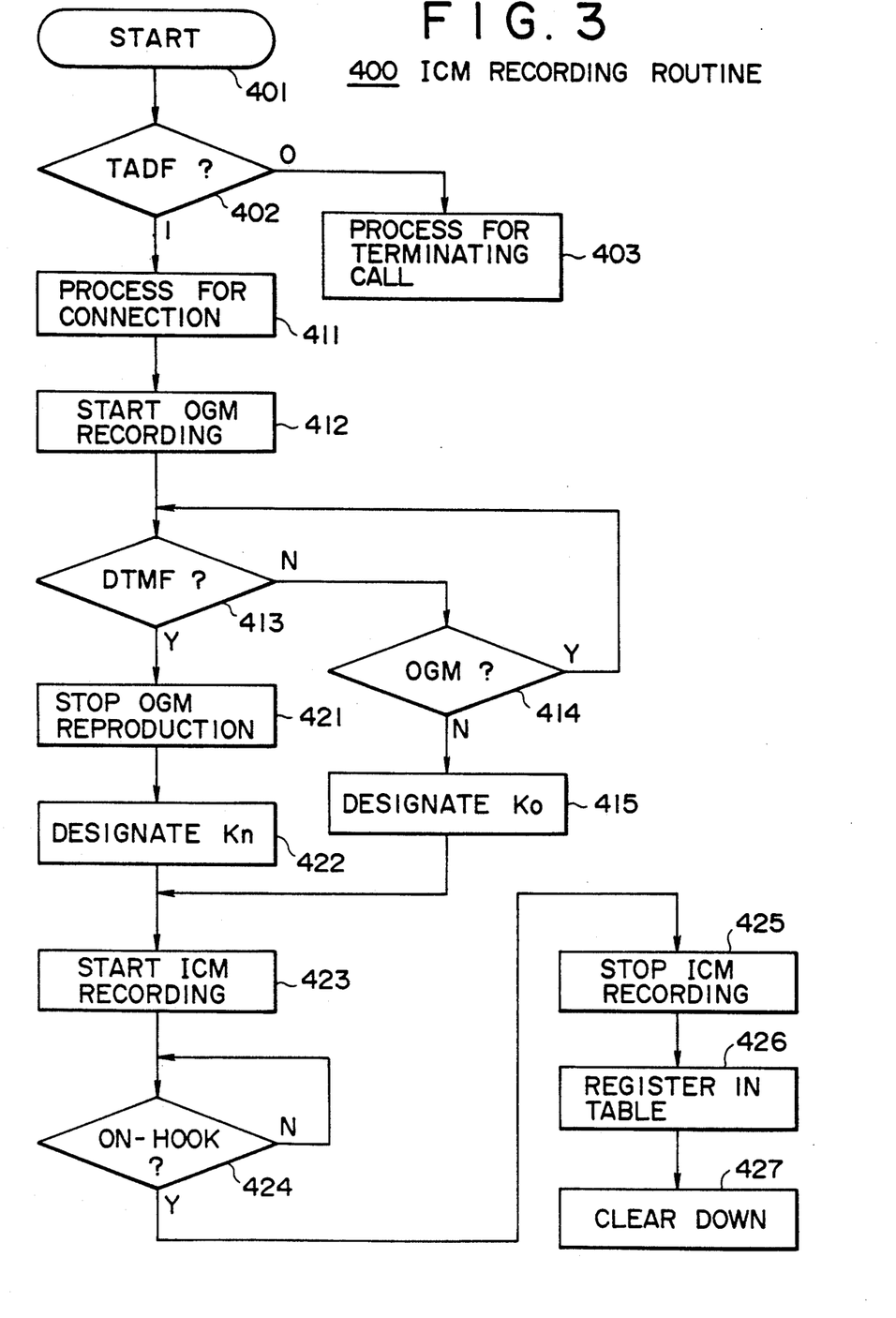
FIG. 3 is a flow chart of a processing routine executed in an ICM (incoming message) recording mode.
Figure 4:
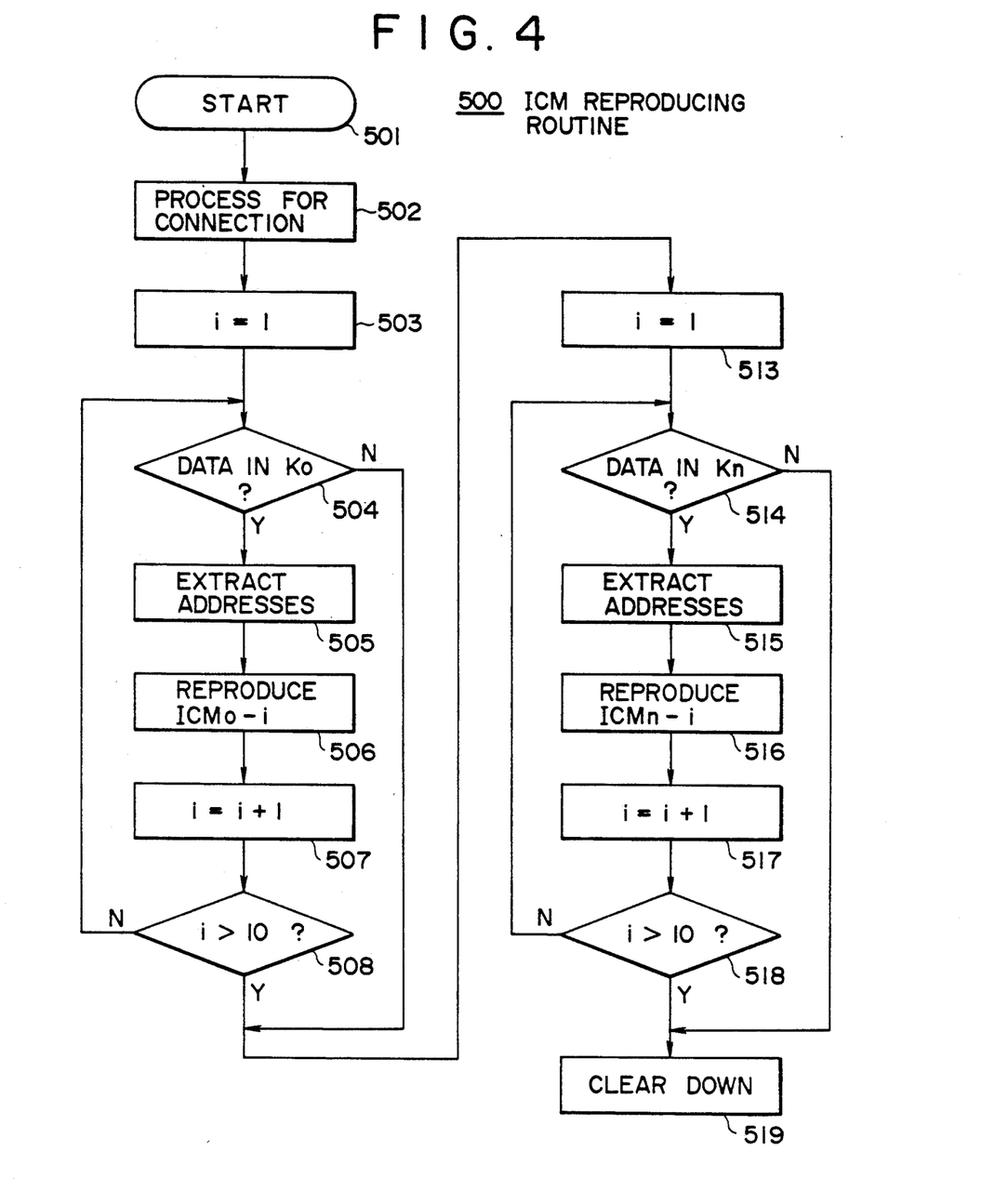
FIG. 4 is a flow chart of a processing routine executed in an ICM reproducing mode.

Meanwhile the master unit 2 is equipped with a transmitting/receiving antenna 200, a transmitting circuit 210, a receiving circuit 220 and a microcomputer 240 which are respectively similar to the transmitting-/receiving antenna 100, the transmitting circuit 110, the receiving circuit 120, the voice transmitter 111, the voice receiver 121 and the microcomputer 140 in the slave unit 1. The microcomputer 240 includes routines 300 to 500 as shown in FIGS. 2 to 4 for example to be executed by a CPU incorporated therein. And further in the memory of the microcomputer 240, there are stored an identification code SYID and a flag TADF relative to the absence answering mode. In this embodiment, "0" of the flag TADF indicates the normal mode, and "1" thereof indicates the absence answering mode.

The master unit 2 is further equipped with a crosspoint switch circuit 251 and a line interface 252, which are both controlled by the microcomputer 240.

Denoted by 260 is a recording/reproducing circuit. This circuit is provided to perform the relay recording function and the absence answering/recording function. In this embodiment, as mentioned above, both a message in the relay recording mode and an ICM in the absence answering/recording mode can be recorded in and reproduced from the memory.

Figure 5:
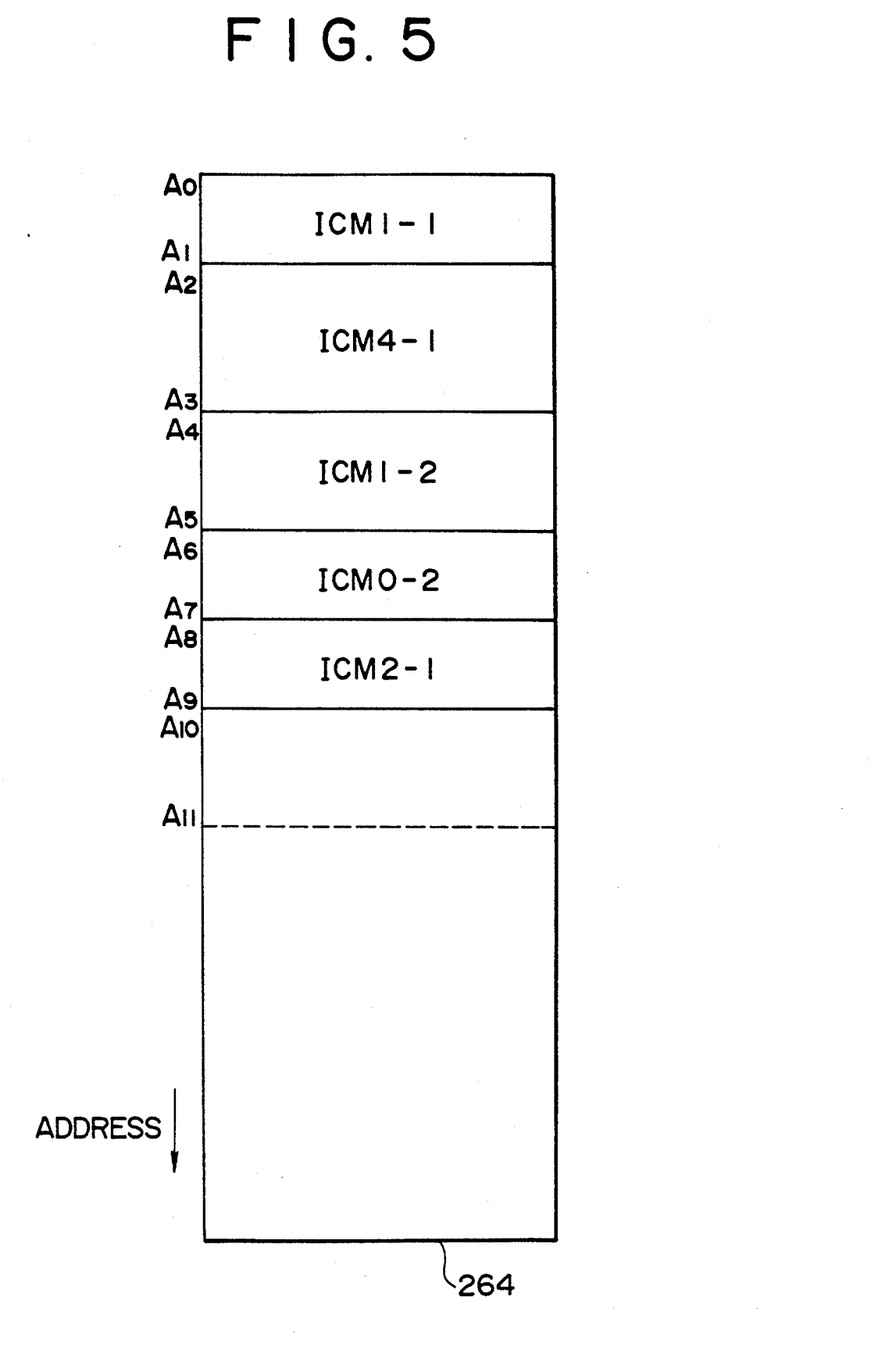
FIG. 5 shows an exemplary memory map.

There are also shown an A D converter 261 for executing analog-to-digital conversion of the ICM voice signal, a D-A converter 262 for executing digital-to-analog conversion of the ICM voice data, a circuit 263 for compressing and expanding the voice data, and memories 264 to 266. As shown in FIG. 5 for example, a plurality of ICMs are recorded in and reproduced from the memory 264. In FIG. 5, ICMn-i denotes an i-th ICM (where n=one of 1 to 5) inputted to the slave unit in (where n is the unit number); and ICM0 i denotes an ICM having no designation with regard to the slave units (where the maximum of i is 10). The memory 264 has a capacity of, e.g., 10 Mbytes for recording ICMs of 15 minutes in all.

Figure 6:
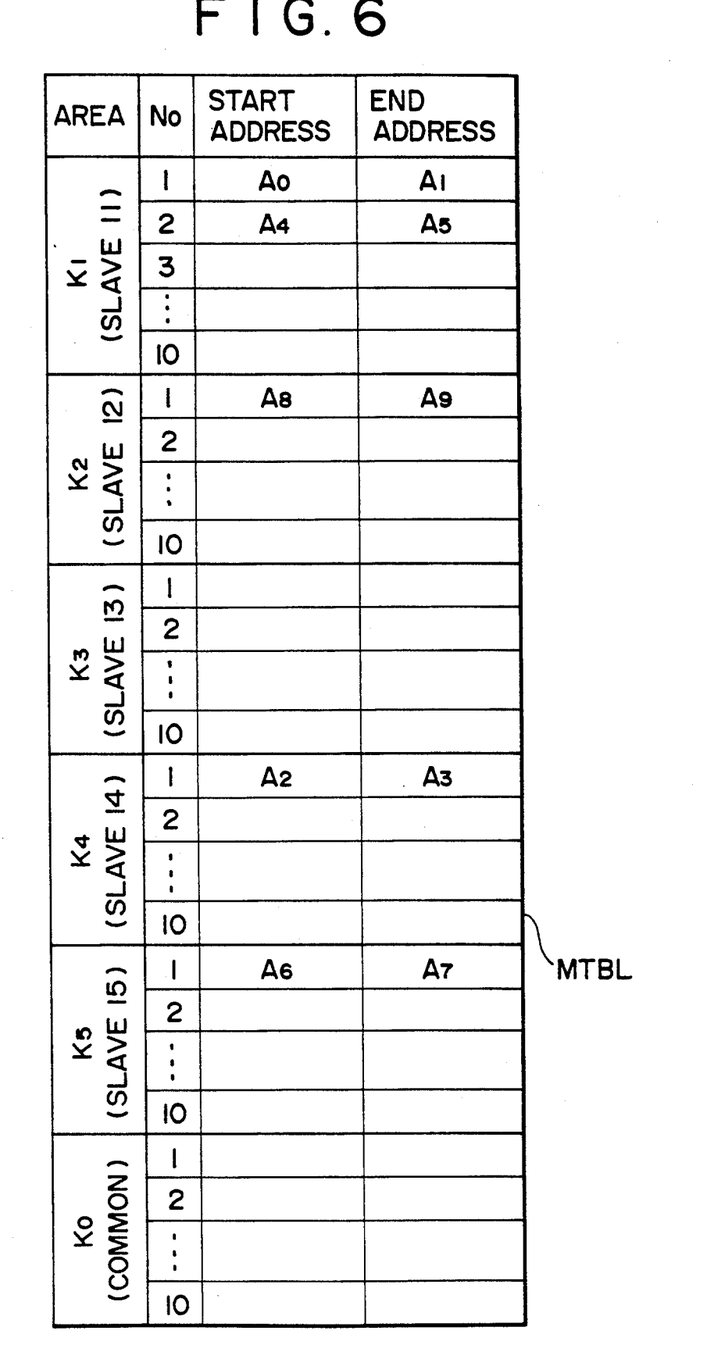
FIG. 6 shows an exemplary management table.

The memory 265 has a table MTBL for managing the ICMs recorded in the memory 264. As shown in FIG. 6 for example, the table MTBL consists of areas K1 to K5 (=Kn) for managing the addresses of the ICMs with respect to the individual slave units 1, and an area Kn for managing the addresses of the ICMs (without any designation of the slave unit) which are common to the entire slave units 11 to 15. Each of the management areas K1 to K5 and K0 has address registration columns for 10 ICMs and, when any ICM has been recorded in the memory 264, the recording start address and end address are retained therein.

In the case of FIGS. 5 and 6 for example, the 2nd ICM1-2 to the slave unit 11 (unit number "1") is recorded at addresses A4 and A5 in the memory 264, so that the addresses A4 and A5 are registered in the 2nd column in the management area K1 of the slave unit 11.

The memory 266 is used for recording an OGM.

The recording/reproducing circuit 260 has a memory controller 267 and, when a command is supplied to the controller 267 from the microcomputer 240, the controller 267 functions in response to such command and controls the operation of writing (recording) the data in or reading (reproducing) the same from the memories 264 and 266, whereby the ICM or OGM voice signal is accessed by the switch circuit 251.

Figure 7:
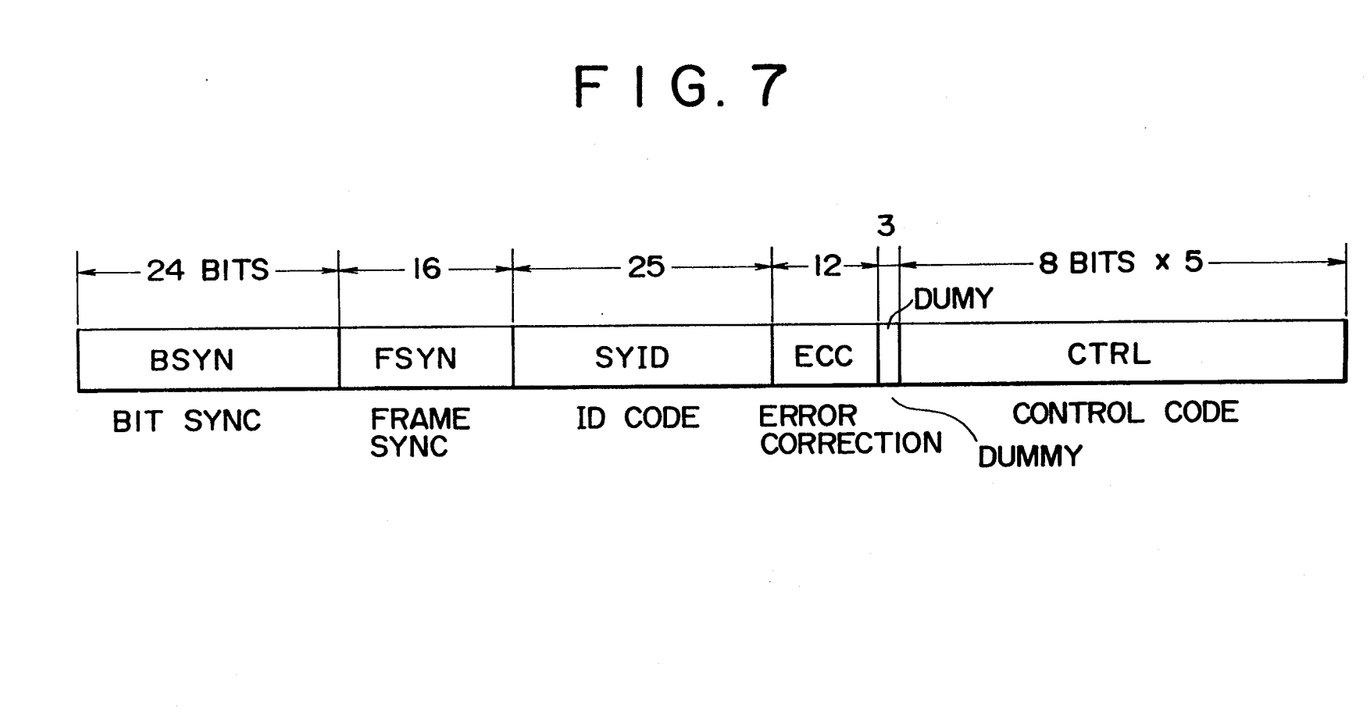
FIG. 7 shows an exemplary signal format.

FIG. 7 shows an exemplary format of the command signal CMND. This signal CMND is accessed between the slave unit 1 and the master unit 2 when a predetermined protocol is executed between the slave unit 1 and the master unit 2 at the time of an originating call or when the data is accessed between such two units. The signal CMND includes a 24-bit sync signal BSYN at its top and a 16 bit frame sync signal FSYN in succession thereto.

The signal CMND further includes a 25-bit system identification code SYID next to the signal FSYN, a 12-bit error correction code ECC for the code SYID, 3 dummy bits DUMY, and a 5-byte control code CTRL in succession to the dummy bits DUMY. In the control code CTRL in this example, the 1st byte represents a code indicative of the control content for the slave unit 1 or the master unit 2, and the 2nd to 5th bytes represent the parameters or data relative to the 1st byte. When it is necessary to access the slave unit code HSID between the slave unit 1 and the master unit 2, the code HSID is accessed by using the control code CTRL.

Upon reception of the command signal CMND by the slave unit 1 or the master unit 2, the microcomputer 140 or 240 checks if the identification code SYID included in such signal CMND (and also the slave unit code HSID) are coincident or not with the identification code SYID (and the slave unit code HSID) stored in the microcomputer. And the command signal CMND is rendered valid only when a coincidence is attained between the codes, or is rendered invalid if no coincidence is attained therebetween.

Call

During a call, a voice signal from the voice transmitter 111 is supplied to the transmitting circuit 110 to be converted into an up-channel FM signal, which is then transmitted via the antenna 100 to the master unit 2. The FM signal thus transmitted from the slave unit 1 is received by the master unit 2 via the antenna 200 and then is supplied to the receiving circuit 220 where the original voice signal is detected. Subsequently the voice signal is sent to the telephone line 3 via the switch circuit 251 and the line interface 252.

The voice signal from the other party on the line 3 is supplied via the line interface 252 and the switch circuit 251 to the transmitting circuit 210 to be converted into a down-channel FM signal, which is then transmitted via the antenna 200 to the slave unit 1. Subsequently the FM signal from the master unit 2 is sent via the antenna 100 to the receiving circuit 12 in the slave unit 1, where the former voice signal is detected and then is supplied to the voice receiver 121.

Accordingly a desired call and talk with the other party can thus be effected.

During such call, the microcomputer 240 executes step 301 of routine 300 to make a decision as to whether there is a clear-down signal or not. If the result of such decision is negative, the process proceeds from step 301 to step 302, where another decision is made as to whether there is a request for the relay recording. And if the result of the decision at step 302 is negative, the process returns to step 301.

Therefore, steps 301 and 302 are repeated during the call, and a clear-down action is continuously monitored at step 301, while a request for the relay recording is monitored at step 302.

Originating call

When the apparatus is in a standby mode, the user depresses the talk key out of the operation keys 132 in the slave unit 1. Then the microcomputer 140 in the slave unit 1 generates a command signal CMND of which control code CTRL indicates a request of a originating call and includes a slave unit code HSID. Subsequently this signal CMND is transmitted to the master unit 2, and thereafter a predetermined command signal CMND is transferred between the master unit 2 and the slave unit 1 from which an originating call has been requested, so that the channel is opened between the slave unit 1 and the master unit 2. Further in the master unit 2, the transmitting circuit 210 and the receiving circuit 220 are connected to the telephone line 3 via the switch circuit 251 and the line interface 252.

Upon input of the telephone number of the called party from the dial keys 131, a command signal CMND having the data of the input telephone number is formed as a control code CTRL, which is then transmitted from the slave unit 1 to the master unit 2, and a DTMF signal representing the telephone number is outputted from the master unit 2 to the telephone line 3. Thereafter, when the called party answers at the other end of the line, a talk can be effected by using the slave unit 1 in the manner mentioned above.

Clearing down

At the end of the talk, the user depresses the talk key out of the operation keys 132 in the slave unit 1. Then a clear-down command signal CMND is transmitted from the slave unit 1 to the master unit 2, where the command signal is detected at step 301. Subsequently the process of the microcomputer 240 proceeds from step 301 to step 303, where a predetermined command signal CMND is transferred between the slave unit 1 and the master unit 2 to thereby inhibit transmission from the master unit 2, and the line interface 252 is held in an on-hook state. In this case, transmission from the slave unit 1 is also inhibited.

The clear down process is thus executed at step 303, and the apparatus is placed in a standby mode.

When the called party at the other end of the line hangs up during the talk, such action is detected at step 301, and the process proceeds to step 303 where the clear-down process is similarly executed, and thereafter the apparatus is placed in the standby mode.

Normal terminating call

In response to a ringer signal received from the telephone line 3 in a terminating call, the process of the CPU in the microcomputer 240 of the master unit 2 is started with step 401 of routine 400, and subsequently the recording/reproducing flag TADF is checked at step 402. Since the flag TADF in this case is "0" which represents a normal mode, the process proceeds from step 402 to step 403. And thereafter a terminating-call process is executed at step 403.

There is generated a command signal CMND of which control code CTRL indicates a request of a terminating call and includes the slave unit code HSID of a preset slave unit 1$m$ (where m=one of 1 to 5), and the signal CMND thus formed is transmitted to the slave unit 1. Thereafter a predetermined command signal CMND is transferred between the master unit 2 and the slave unit 1$m$ corresponding to the slave unit code HSID, whereby the channel is opened between the master unit 2 and the slave unit 1$m$. And in the slave unit 1$m$, the ringer 139 is driven to inform the user of the terminating call.

When the user depresses the talk key out of the operation keys 132 in the slave unit 1, a predetermined command signal CMND is transferred between the slave unit 1$m$ and the master unit 2, so that the transmitting circuit 210 and the receiving circuit 220 are connected to the telephone line 3 via the switch circuit 251 and the line interface 252. Meanwhile the ringer 139 in the slave unit 1$m$ is inhibited from being driven.

Accordingly a talk with the calling party at the other end of the line can be effected thereafter by using the slave unit 1$m$.

Relay recording

Relative to the slave units 1$p$ and 1$n$ (where p, n=one of 1 to 5, and p=n) of the entire slave units 11 to 15, if there is a message, during a talk between the slave unit 1$p$ and the telephone line 3, to the user of the other slave unit 1$p$ from the calling party via the line 3, the user of the slave unit 1$p$ depresses the recording key out of the operation keys 132 in the slave unit 1$p$ and simultaneously the numeral key corresponding to the unit number n of the slave unit 1$n$ out of the dial keys 131.

If the calling party requests a message to the user of the slave unit 11 (unit number "1") during a talk between the slave unit 12 and the telephone line 3, the user of the slave unit 12 tells the calling party on the line 3 that "Speak your message to him and hang up the phone after completion of the message". Subsequently the user of the slave unit 12 depresses the key "1" out of the dial keys 131 while depressing the recording key of the slave unit 12.

Then in the slave unit 1p, there is generated a command signal CMND of which control code CTRL indicates a request of the relay recording and includes the identification code HSID of the slave unit 1n. This command signal CMND is transmitted to the master unit 2.

In response to such command signal CMND transmitted from the slave unit 1p during the call to the slave unit 2, the request of the relay recording is detected at step 302 of routine 300 in the master unit 2, and the process proceeds from step 302 to step 311 where the channel between the slave unit 1p and the master unit 2 is closed, so that transmission to the master unit 2 is inhibited, and the slave unit 1p is placed in a standby mode.

Subsequently the process of the microcomputer 240 proceeds from step 311 to step 312, where the identification code HSID of the slave unit 1n transmitted from the slave unit 1p is converted into data that designates the management area Kn of the slave unit 1n. Since in this case the recording key and the key "1" of the slave unit 12 are in a depressed state, the identification code HSID for the slave unit 11 is converted into data that designates the management area K1 of the slave unit 11.

Next the process proceeds to step 313 where the command is supplied from the microcomputer 240 to the controller 267 to thereby permit writing in a blank area of the memory 264. In the exemplary case of FIGS. 5 and 6, the start address in the blank area of the memory 264 is A10, so that writing is permitted to start with the address A10.

Thus, when the calling party speaks his ICM (message to the user of the slave unit 1n), the voice signal of such ICM is supplied to the recording/reproducing circuit 260 via the line interface 252 and the switch circuit 251, and is further fed to the D-A converter 264 where the voice signal is converted to a digital signal, which is then compressed by the compressing/expanding circuit 267. The voice data thus compressed is supplied to the memory 264 and is written therein sequentially from the address A10 in this exemplary case.

During such operation, the process of the microcomputer 240 proceeds from step 313 to step 314, where a decision is made as to whether the calling party has on-hooked or not. If the result of such decision is negative, the process returns to step 314 to repeat the same. The ICM is thus recorded in the memory 264, and the on-hook of the calling party is continuously monitored during the recording operation.

The subsequent on-hook of the calling party after the end of the ICM is detected at step 314, and the process proceeds from step 314 to step 315 where a predetermined command is supplied from the microcomputer 240 to the controller 267, and the operation of writing the ICM in the memory 264 is completed. Next at step 314, the start address and the end address of such writing are registered in the first blank column of the management area Kn in the table MTBL.

The ICM mentioned above is the one relative to the slave unit 11, and the data indicative of the management area K1 has already been obtained at step 312, so that if the memory 264 is in the state of FIGS. 5 and 6, the addresses A10 and A11 are registered, as the ICM start address and end address respectively, in the 3rd column of the management area K1 in the table MTBL.

Thereafter the process of the microcomputer 240 proceeds from step 316 to step 317 where a clear-down process is executed, and the apparatus is placed in the standby mode.

Similarly to the above procedure, if more messages to the user of the slave unit 1m are received thereafter, such messages from calling parties are written sequentially in the memory 264, and the start and end addresses of the written messages are registered sequentially in the columns of the management area Kn of the slave unit 1n designated by the slave unit 1p.

Setting of absence answering/recording mode

When the slave unit 1 is in a standby mode, the user depresses, out of the operation keys 132, the absence key simultaneously with depression of the register key. Then, there is generated a command signal CMND of which control code CTRL indicates an absence answering/recording mode, and this command signal CMND is transmitted to the master unit 2.

In response to such command signal CMND received by the master unit 2, the recording/reproducing flag TADF is set to "1", and there is generated a command signal CMND having a control code CTRL which indicates confirmation of setting of the recording/reproducing flag TADF. This command signal CMND is transmitted to the slave unit 1, and thereafter the master unit 2 is placed in the standby mode.

In response to the command signal CMND which signifies such confirmation, the slave unit 1 is placed also in the standby mode.

Resetting of absence answering/recording mode

When the slave unit 1 is in the standby mode, the user depresses the presence key, out of the operation keys 132, simultaneously with depression of the register key. Then, the recording/reproducing flag TADF of the master unit 2 is set to "0" as in the aforementioned setting of the flag TADF.

Terminating call in absence answering/recording mode

This embodiment comprises five slave units 1 which are numbered "1" to "5" respectively.

When it is desired to keep the ICM secret from and unhearable by anybody else, the user of the slave unit 1 previously let his friends and so forth know the number n of the slave unit 1n allocated to him.

And in a terminating call, the calling party speaks an ICM after depressing the numeral key which, out of the dial keys 131, corresponds to the relevant unit number n. Then such ICM is recorded in the memory 264 in such a manner as to be reproducible merely by the slave unit 1n alone of the relevant number n.

In a terminating call, if the calling party speaks an ICM without depressing the relevant numeral key, such ICM is recorded in the memory 264 in a manner to be reproducible by anybody as well.

More specifically, when a ringer signal is received via the telephone line 3 in a terminating call, the process of the CPU in the microcomputer 240 starts with step 401 of routine 400 in the master unit 2 as in the aforementioned case of [Normal terminating call], and the recording/reproducing flag TADF is checked at step 402. Since the flag TADF is "1" in this example to indicate the absence answering/recording mode, the process proceeds from step 402 to step 411, where the recording/reproducing circuit 260 is connected to the telephone line 3 via the switch circuit 251 and the line interface 252. And next at step 412, a command for starting the reproduction of the OGM is supplied to the memory controller 267.

Consequently the data of the OGM begins to be read out from the memory 266 and then is expanded to the former voice data by the compressing/expanding circuit 263. The voice data is further supplied to the D-A converter 262 where digital-to analog conversion is executed, and the analog voice signal thus obtained is sent to the telephone line 3 via the switch circuit 251 and the line interface 252.

It follows that the calling party at the other end of the line can hear the OGM which runs for example as: "This is Taro Yamada. I am out now. So please speak your message."

During reproduction of such OGM, the process of the microcomputer 240 proceeds from step 412 to step 413, where a decision is made as to whether the calling party has depressed the dial numeral key or not, i.e., whether there is the DTMF signal transmitted by depression of the dial key from the calling party. If the result of such decision is negative to signify that the DTMF signal is not present, the process proceeds from step 413 to step 414, where another decision is made as to whether reproduction of the OGM by the recording-/reproducing circuit 260 has been completed or not. And if the result of this decision is negative, the process returns to step 413 from step 414.

Accordingly, during the reproduction of the OGM, the presence or absence of the DTMF signal from the calling party is continuously monitored at step 413.

When it is necessary for the calling party to convey the ICM to the user of the slave unit 1n having the number n, the calling party depresses, during the reproduction of the OGM, the dial numeral key of his telephone set corresponding to the relevant slave unit number n. For example, the calling party depresses the dial numeral key "1" for conveying the ICM to the user of the slave unit 11 having the unit number 1.

Then the DTMF signal indicative of the numeral key is sent from the telephone set of the calling party, and such signal is detected at step 413. Thereafter the process of the microcomputer 240 proceeds from step 413. Thereafter the process of the microcomputer 240 proceeds from step 413 to step 421, where a predetermined command is supplied from the microcomputer 240 to the controller 267 to halt the reproduction of the OGM. Subsequently at step 422, the DTMF signal transmitted from the calling party is decoded to be converted into the data that designates the management area Kn. In this example where the key "1" is depressed by the calling party, the signal is converted into the data that designates the management area K1 in the slave unit 11 of the number "1".

The process then proceeds to step 423 where a predetermined command is supplied from the microcomputer 240 to the controller 267, so that writing in the blank area of the memory 264 is permitted. In the state of FIGS. 5 and 6 where the start address in the blank area of the memory 264 is A10, the writing is permitted to start with the address A10.

Therefore, when the calling party speaks his ICM, the voice signal thereof is supplied via the line interface 252 and the switch circuit 251 to th recording/reproducing circuit 260, and is further fed to the A-D converter 261 where analog-to-digital conversion is executed to thereby obtain a digital signal. Such digital signal is compressed by the compressing/expanding circuit 267, and the compressed voice data is supplied to the memory 264 to be written therein sequentially from the address A10.

During the above operation, the process of the microcomputer 240 proceeds from step 423 to step 424, where a decision is made as to whether the calling party has on-hooked or not. If the result of such decision is negative, the process remains at step 424 to repeat the same. During the time of recording the ICM in the memory 264, the on-hook by the calling party is continuously monitored.

In response to the on-hook action of the calling party after the end of the ICM, such action is detected at step 424, and subsequently the process proceeds from step 424 to step 425 where a predetermined command is supplied from the microcomputer 240 to the controller 267. Upon completion of writing the ICM in the memory 264, the writing start address and end address are registered in the first blank column of the management area Kn in the table MTBL.

The ICM in this exemplary case is the one relative to the slave unit 11, and the data indicative of the management area K1 has already been obtained at step 422, so that if the memory 264 is in the state of FIGS. 5 and 6, the ICM start address A10 and end address All are registered in the 3rd column of the management area K1 in the table MTBL.

Thereafter the process of the microcomputer 240 proceeds from step 426 to step 427 where the cleardown process is executed, and the apparatus is placed in the standby mode. ICMs from calling parties in terminating calls are written sequentially in the memory 264 and, if the slave unit 1 is designated, the start and end addresses of the written ICMs are registered sequentially in the column of the management area Kn in the table MTBL of the memory 265 relative to the designated slave unit 1n.

Meanwhile during the repetition of steps 413 and 414, the OGM data is read out from the memory 266 and is transmitted to the calling party at the other end of the telephone line. And upon completion of reading the entire OGM data, a signal indicative of such a state is fed from the controller 267 to the microcomputer 240.

The end of the OGM is detected at step 414, and the process proceeds from step 414 to step 415 where the data for designating the common management area K0 is generated. And thereafter the process proceeds to step 423.

Accordingly the ICM from the calling party is written in the blank area of the memory 264, and the start and end addresses of the written message are registered in the 1st blank column of the management area K0.

Thus, if the calling party depresses the dial numeral key to designate the slave unit 1 during the OGM being heard, the ICM-recorded area in the memory 264 is registered in the management area Kn corresponding to the slave unit 1n. In case such numeral key is not depressed, the ICM-recorded area in the memory 264 is registered in the common management area K0.

Reproduction of relay-recorded ICM and absence-recorded ICM

When the slave unit 1n is in the standby mode, the user depresses the reproducing key out of the operation keys 132.

Then, routine 500 is executed in the master unit 2 so that the user of the slave unit 1n can hear the ICM recorded for him alone. More specifically, in response to depression of the reproducing key out of the operation keys 132, there is generated a command signal CMND of which control code indicates a request for reproduction of the ICM and includes the identification code HSID of the slave unit 1n. This command signal CMND is transmitted to the master unit 2, so that the process of the microcomputer 240 starts with step 501 of routine 500 in the master unit 2. Subsequently at step 502, a predetermined command signal CMND is transferred between the master unit 2 and the slave unit 1n from which reproduction of the recorded ICM has been requested, whereby the channel between the master unit 2 and the slave unit 1n is opened.

Subsequently at step 503, the variable i is set to 1, and then a decision is made at step 504 as to whether any start and end addresses ar registered in the 1st column of the common management area K0 in the table MTBL. In the exemplary case of FIG. 6 where the addresses have already been registered, the process proceeds from step 504 to step 505 for extracting the start and end addresses registered in the i-th column. Next at step 506, a predetermined command is supplied from the microcomputer 240 to the controller 267, and the data ICM0-i of the entire ICM data written in the memory 264 are read out sequentially from the area addressed by the start and end addresses registered in the i-th column.

The ICM data ICM0-i thus read out is expanded by the compressing/expanding circuit 263 to the former data and is further fed to the D-A converter 262, where digital-to-analog conversion is executed to obtain an analog signal. Such analog signal is supplied via the switch circuit 251 to the transmitting circuit 210, from which the signal is transmitted to the slave unit 1n.

Upon completion of reading the data ICM0-i, the process of the microcomputer 240 proceeds from step 506 to step 507 where the variable i is incremented by 1. Subsequently at step 508, a decision is made as to whether the variable i is greater than 10. And if the result of such decision is negative, the process returns to step 504 from step 508.

Therefore, if the start and end addresses have already been registered in the column of the common management area K0, the ICM data ICM0-i are read out sequentially from the area addressed by such start and end addresses in the memory 264, and the voice signal of the ICM data is transmitted to the slave unit 1n.

The process proceeds from step 504 or 508 to step 513 when the ICM data in the area addressed by the start and end addresses registered in the management area K0 of the table MTBL have been read out entirely from the memory 264, i.e., when none of the start and end addresses is left in any column of the management area K0 at step 504, or when the variable i has exceeded 10 at step 508.

Subsequently the variable i is set to 1 at step 513, and a decision is made at step 514 as to whether any start and end addresses are registered in the management area Kn corresponding, out of the areas K1 to K5 in the table MTBL, to the slave unit code HSID sent from the slave unit 1n, i.e., in the 1st column of the management area Kn corresponding to the slave unit 1n.

When the slave unit 1n is the one denoted by 11 in the exemplary case of FIG. 6, the start and end addresses have already been registered. Therefore the process proceeds from step 514 to step 515 where the start and end addresses registered in the i-th column are extracted. And subsequently at step 516, a predetermined command is supplied from the microcomputer 240 to the controller 267, and the data ICMn-i of the entire ICM data written in the memory 264 are read out sequentially from the area addressed by the start and end addresses registered in the i-th column.

The ICM data ICMn-i thus read out is expanded by the compressing/expanding circuit 263 to the former data, which is then supplied to the D-A converter 262 where digital-to-analog conversion is executed to obtain an analog signal. Such analog signal is then supplied via the switch circuit 251 to the transmitting circuit 210, from which the signal is transmitted to the slave unit 1n.

Upon completion of reading the data ICMn-i, the process of the microcomputer 240 proceeds from step 516 to step 517 where the variable i is incremented by 1. Subsequently at step 518, a decision is made as to whether the variable i is greater than 10. And if the result of such decision is negative, the process returns to step 514 from step 518.

Therefore, if the start and end addresses have already been registered in the column of the management area Kn, the ICM data ICMn-i are read out sequentially from the area addressed by the start and end addresses in the memory 264, and the voice signal of such ICM data is transmitted to the slave unit 1n.

The process proceeds from step 514 or 508 to step 519 when the ICM data in the area addressed by the start and end addresses registered in the management area Kn of the table MTBL have been read out entirely from the memory 264, i.e., when none of the start and end addresses is left in any column of the management area K0 at step 514, or when the variable i has exceeded 10 at step 518.

Subsequently a clear-down process is executed at step 519, and the apparatus is placed in the standby mode.

Therefore in the slave unit 1n, the ICMs in the common management area K0 of the memory 261 are outputted sequentially in the form of voice from the voice receiver 121, and then the ICMs in the management area Kn of the slave unit 1n are outputted sequentially in the form of voice.

Thus in the slave unit 1n, it is possible to sequentially hear, out of the entire ICMs (messages stored in the relay recording mode and the absence answering-/recording mode), the ICMs in the common management area K0, and thereafter to hear the ICM in the management area Kn of the slave unit 1n.

Erasure of ICM

When one ICM read out from the memory 264 is being outputted in the form of voice from the slave unit 1n, the user depresses the key "7" out of the dial keys 131. Then such depression is detected by the master unit 2 to erase from the table MTBL the start and end addresses which are addressing the ICM area at that time, and the relevant ICM in the memory 264 is also erased therefrom.

Since a blank column and a blank area are caused in the table MTBL and the memory 264 respectively due to the erasure of the ICM, garbage correction is performed to eliminate such blank column and area.

Other processes

In the above embodiment, the management areas K1 to K5 are prepared independently of one another to register the start and end addresses for individual ICMs. However, it may be so modified that a plurality of data sets, each consisting of a slave unit code HSID (slave unit number), a start address and an end address, are registered sequentially in the individual management areas. And in response to a request for reproduction of the ICM from the slave unit 1, the data set consisting of the slave code HSID, the start address and the end address is retrieved on the basis of the code HSID of the slave unit 1 relevant to such request, whereby the ICM can be reproduced after extraction of the start and end addresses from the result of such retrieval.

According to the present invention, when one numeral key out of the dial keys 131 indicative of the slave unit 1n is depressed in the slave unit 1p during a call between the slave unit 1p and the outside telephone line 3, an incoming message via the line 3 is recorded in the memory 264 of the recording/reproducing circuit 260 incorporated in the master unit 2, and the addresses indicating the area of the recorded message are registered in the management area Kn corresponding to the depressed numeral key. And in response to a predetermined key operation performed in the slave unit 1n, the recorded message is reproduced from the area of the addresses indicated by the management area Kn in the memory 264 corresponding to the slave unit 1n, and the message thus reproduced is forwarded from the master unit 2 to the key-operated slave unit 1n.

Therefore, a message to the user of the slave unit 1n can be accepted even during a call between the outside telephone line 3 and the slave unit 1p, and the message can be relayed properly to the user of the slave unit 1n. It is further possible to enable merely the user of the slave unit 1n alone to hear the message while preventing any other person from hearing the same, hence ensuring maintenance of privacy.

What is claimed is:

1. A cordless telephone apparatus comprising:
   a master unit connected to an outside telephone line;
   a plurality of slave units each connected to said master unit via a radio wave channel, each of said slave units having designating means for designating a selected slave unit and key input means for activating said master unit to reproduce a recorded message;
   wherein said master unit includes a recording/reproducing means for recording an incoming message originated from a calling party through the telephone line and reproducing the recorded message; said recording/reproducing means having a recording medium to record and reproduce the message, and memory means for managing the message recorded on said recording medium and for assigning a memory designation on said recording medium for associating the message with said selected slave unit; and
   when said designating means is activated to designate said selected slave unit, said recording/reproducing means is activated for recording the incoming message from the calling party on the recording medium in said recording/reproducing means, and said memory means is activated for assigning a memory designation on said recording medium for associating the incoming message with said selected slave unit in said memory means; and in response to activation of said key input means in said selected slave unit the message associated with said selected slave unit is reproduced from said recording medium in accordance with said memory designation in said memory means.

2. A cordless telephone apparatus equipped with a master unit capable of handling a plurality of salve units, each of said slave units having designating means for designating a selected slave unit and key input means for activating said master unit to reproduce a recorded message, said master unit including a recording/reproducing means for recording an incoming message originated from a calling party through a telephone line and reproducing the recorded message; said recording/reproducing means having a recording medium to record and reproduce the message, and memory means for managing the message recorded on said recording medium and for assigning a memory designation on said recording medium for associating the message with said selected slave unit;
   wherein, when said designating means is activated in a first slave unit to designate a second slave unit during a call between said first slave unit and the telephone line, said recording/reproducing means is activated for recording the incoming message from the calling party through the telephone line on the recording medium in said recording/reproducing means, and said memory means is activated for assigning a memory designation on said recording medium for associating the incoming message with said second slave unit in said memory means; and in response to activation of said key input means in said second slave unit, the message associated with said second slave unit is reproduced in accordance with said memory designation in said memory means and then is transmitted from said master unit to said second slave unit.

3. A cordless telephone apparatus equipped with a master unit capable of handling a plurality of slave units, each of said slave units having designating means for designating a selected slave unit and key input means for activating said master unit to reproduce a recorded message, said master unit including a recording/reproducing means for recording an incoming message originated from a calling party through a telephone line and reproducing the recorded message; said recording/reproducing means having a recording medium to record and reproduce the message, and memory means for managing the message recorded on said recording medium and for providing a table on the recording medium having a memory designation for associating the message with said selected slave unit;
   wherein, when said designating means is activated in a first slave unit to designate a second slave unit during a call between said first slave unit and the telephone line, said recording/reproducing means is activated for recording the incoming message from the calling party through the telephone line on the recording medium in said recording/reproducing means, and said memory means is activated for providing a table on said recording medium having a memory designation for associating the incoming message with said second slave; and in response to a activation of said key input means in said second slave unit, the message associated with said memory designation for said second slave unit is extracted from said table, reproduced and then transmitted from said master unit to said second slave unit.

4. A cordless telephone apparatus equipped with a master unit capable of handling a plurality of slave units, each of said slave units having designating means for designating a selected slave unit and key input means for activating said master unit upon activation of said designating means and key input means for activating said master unit to reproduce a recorded message, said master unit including a recording/reproducing means for recording an incoming message originated from a calling party through a telephone line and reproducing the recorded message; said recording/reproducing means having a recording medium to record and reproduce the message, and memory means for managing the message recorded on said recording medium and for providing a table on the recording medium having a memory designation for associating the message with said selected slave unit;

wherein, when said designating means is activated in a first slave unit to designate a second slave unit during a call between said first slave unit and the telephone line, said first slave unit is disconnected from said master unit and said recording/reproducing means is activated for recording the incoming message from the calling party through the telephone line on the recording medium in said recording/reproducing means, and said memory means is activated for providing a table on said recording medium having a memory designation for associating the incoming message with said second slave; and in response to a activation of said key input means in said second slave unit, the message associated with said memory designation for said second slave unit is extracted from said table, reproduced and then transmitted from said master unit to said second slave unit.

5. A cordless telephone apparatus comprising:
a master unit connected to an outside telephone line;
a plurality of slave units each connected to said master unit via a radio wave channel, each of said slave units having key input means for reproducing a recorded message;
wherein said master unit includes a recording/reproducing means for recording an incoming message originated from a calling party through the telephone line and reproducing the recorded message; said recording/reproducing means having a recording medium to record and reproduce the message, and memory means for managing the message recorded on said recording medium and for assigning a memory designation on said recording medium for associating the message with slave unit;
when said calling party on the line depresses, out of dial keys, a numeral key corresponding to said slave unit in an absence answering/recording mode, an incoming message originated from the calling party is recorded on the recording medium in said recording/reproducing means, and memory means is activated for assigning a memory designation on said recording medium for associating the incoming message with said slave unit is said memory means; and in response to activation of said key input means, the message associated with the key-operated slave unit is reproduced from said recording medium in accordance with said memory designation in said memory means.

6. A cordless telephone apparatus comprising:
a master unit connected to an outside telephone line; and
a plurality of slave units each connected to said master unit via a radio wave channel, each of said slave units having key input means for reproducing a recorded message;
wherein said master unit includes a recording/reproducing means for recording an incoming message originated from a calling party through the telephone line and reproducing the recorded message; said recording/reproducing means having a recording medium to record and reproduce the message, and memory means for managing the message recorded on said recording medium and for providing a table on the recording medium having a memory designation for associating the message with a slave unit; and
when said calling party on the telephone line depresses, out of dial keys, a numeral key corresponding to said slave unit, an incoming message originated from the calling party is recorded on the recording medium in said recording/reproducing means, and said memory means is activated for providing a table on said recording medium having a memory designation for associating the incoming message with a slave unit; and in response to activation of said key input means, the message associated with said memory designation is extracted from said table, reproduced and transmitted from said master unit to said key-operated slave unit.

* * * * *